United States Patent [19]

Kaul

[11] Patent Number: 5,510,403

[45] Date of Patent: Apr. 23, 1996

[54] PROCESS FOR MASS PIGMENTING OF SYNTHETIC POLYAMIDES

[75] Inventor: Bansi L. Kaul, Biel-Benken, Switzerland

[73] Assignee: Sandoz Ltd., Basel, Switzerland

[21] Appl. No.: 638,273

[22] Filed: Jan. 7, 1991

Related U.S. Application Data

[63] Continuation of Ser. No. 541,226, Jun. 20, 1990, abandoned, which is a continuation of Ser. No. 249,037, Sep. 23, 1988, abandoned.

[30] Foreign Application Priority Data

Sep. 23, 1987 [DE] Germany ............... 37 31 929.9

[51] Int. Cl.⁶ .................................................. C08K 5/34
[52] U.S. Cl. ........................... 524/90; 524/89; 524/91; 524/92; 524/94
[58] Field of Search ................... 524/90, 89, 91, 524/92, 94

[56] References Cited

FOREIGN PATENT DOCUMENTS

| 1488981 | 10/1977 | United Kingdom. |
| 1513168 | 6/1978 | United Kingdom. |
| 1534787 | 12/1978 | United Kingdom. |

*Primary Examiner*—Edward J. Cain
*Attorney, Agent, or Firm*—Robert S. Honor; Carl W. Battle; Thomas C. Doyle

[57] ABSTRACT

A process for dyeing synthetic polyamide comprising applying to the polyamide a compound of formula I or II

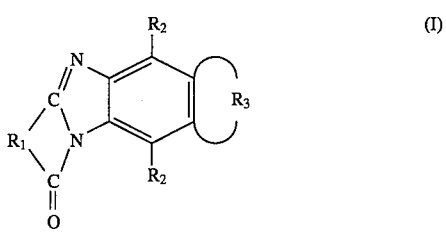

(I)

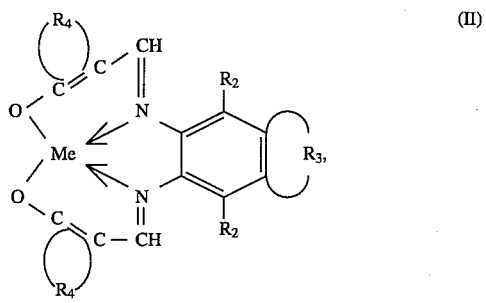

(II)

in which $R_2$ is hydrogen, trifluoromethyl, halogen, $C_{1-4}$alkyl, $C_{1-4}$alkoxy, cyano, nitro, hydroxyl, amino, $C_{1-4}$alkylamino, di-$(C_{1-4})$alkylamino, phenylamino, N-$C_{1-4}$alkyl-N-phenylamino; benzoylamino, acyl, acyloxy or acylamino, Me is a divalent metal atom;

$R_1$ is 1,2-phenylene, 1,2-, 2,3- or 1,8-naphthalene or 2,2'-diphenylene, the phenylene and naphthalene groups of $R_1$ being unsubstituted or mono- or di-substituted by $R_{2a}$ where $R_{2a}$ has a significance of $R_2$ other than hydrogen or by 3 or 4 halogen atoms; or in the naphthalene group two adjacent carbon atoms can be bridged by —NH—CO—NH—, —N=C(CH₃)—NH—, —N=C(C₆H₅)—NH—, —CO—N(C₆H₅)—CO—, —CO—NH—CO—,

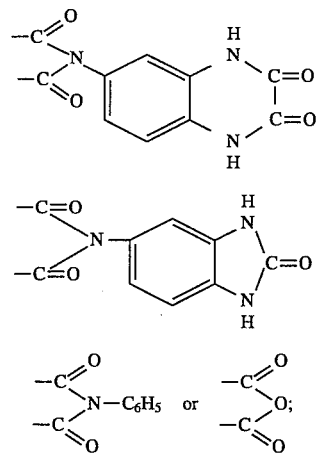

$R_3$ is

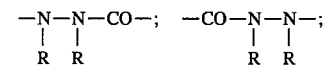

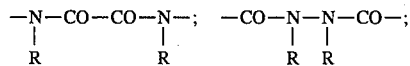

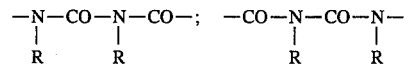

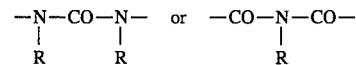

where R is hydrogen or $C_{1-4}$alkyl unsubstituted or substituted by 1 to 4 groups selected from halogen, cyano, $C_{1-4}$alkoxy, phenyl, phenoxy, acyl, acyloxy or acylamino; and $R_4$ together with the two carbon atoms to which they are attached form a 5 or 6-membered carbocyclic or heterocyclic group or form a 9- or 10-membered bicyclic carbocyclic or heterocyclic group, the rings of $R_4$ being unsubstituted or substituted by 1, 2 or 3 groups $R_{2a}$ when $R_{2a}$ has a significance of $R_2$ other than hydrogen.

28 Claims, No Drawings

PROCESS FOR MASS PIGMENTING OF SYNTHETIC POLYAMIDES

This is a continuation of application Ser. No. 07/541,226, filed Jun. 20, 1990, now abandoned, which in turn is a continuation of application Ser. No. 07/249,037, filed Sep. 23, 1988, now abandoned.

The invention relates to a process for mass dyeing of synthetic polyamides.

According to the invention, there is provided a process for dyeing synthetic polyamide comprising applying to the polyamide a compound of formula I or II

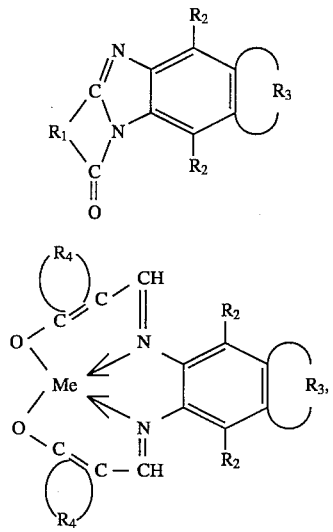

in which $R_2$ is hydrogen, trifluoromethyl, halogen, $C_{1-4}$alkyl, $C_{1-4}$alkoxy, cyano, nitro, hydroxyl, amino, $C_{1-4}$alkylamino, di-($C_{1-4}$)alkylamino, phenylamino, N-$C_{1-4}$alkyl-N-phenylamino; acyl, acyloxy or acylamino, Me is a divalent metal atom; $R_1$ is 1,2-phenylene, 1,2-, 2,3- or 1,8-naphthylene or 2,2'-diphenylene, the phenylene and naphthylene groups of $R_1$ being unsubstituted or mono- or di-substituted by $R_{2a}$ where $R_{2a}$ has a significance of $R_2$ other than hydrogen or by 3 or 4 halogen atoms; or in the naphthylene group two adjacent carbon atoms can be bridged by —NH—CO—NH—, —N=C(CH$_3$)—NH—, —N=C(C$_6$H$_5$)—NH—, —CO—N(C$_6$H$_5$)—CO—, —CO—NH—CO—,

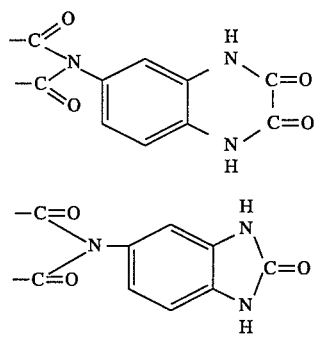

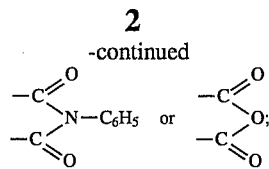

$R_3$ is

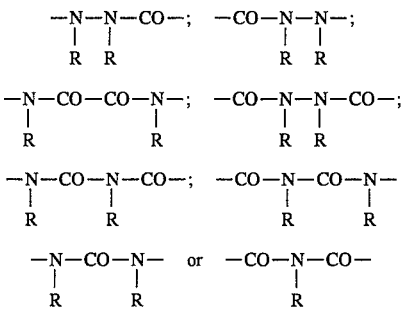

where R is hydrogen or $C_{1-4}$alkyl unsubstituted or substituted by 1 to 4 groups selected from halogen, cyano, $C_{1-4}$alkoxy, phenyl, phenoxy, acyl, acyloxy or acylamino; and $R_4$ together with the two carbon atoms to which it is attached forms a 5 or 6-membered carbocyclic or heterocyclic group or a 9- or 10-membered bicyclic carbocyclic or heterocyclic group, the rings of $R_4$ being unsubstituted or substituted by 1, 2 or 3 groups $R_{2a}$ where $R_{2a}$ a has a significance of $R_2$ other than hydrogen.

In this Specification, where a symbol appears more than once in a formula, its significances are independent of one another unless indicated to the contrary.

In this Specification preferably any acyl group is a —CO—$R_{10}$, —SO$_2$—$_{C6}$H$_5$ or SO$_2$C$_{1-4}$alkyl group where $R_{10}$ is selected from $C_{1-4}$alkyl, phenyl, $C_{2-4}$alkenyl, $C_{1-4}$alkoxy, hydrogen and phenoxy. Any acyloxy group is preferably —O—CO—$R_{10}$ or —O—SO$_2$—C$_6$H$_5$ or —O—SO$_2$C$_{1-4}$alkyl and any acylamino is preferably —N($R_{10a}$)COR$_{10}$ or —N($R_{10a}$)SO$_2$C$_{1-4}$alkyl or —N($R_{10a}$)SO$_2$—C$_6$H$_5$ where $R_{10a}$ is hydrogen, $C_{1-4}$alkyl or phenyl.

Preferably any halogen present is chloro or bromo.
Preferably $R_3$ is $R_3'$ where $R_3'$ is

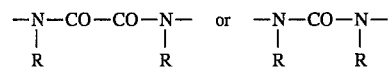

where R is defined above.
Preferably R is hydrogen.
Preferably $R_1$ is $R_1'$ where $R_1'$ is 1,2-phenylene unsubstituted or substituted by 1 to 4 halogen atoms or 1,8-naphthalene, unsubstituted or substituted by 1 to 4 halogen atoms or mono- or di-substituted by amino, nitro, methoxy, phenylamino, acetylamino or benzoylamino or bridged in the 4,5-position by —NH—CO—NH—, —N=C(CH$_3$)—NH—, —N=C(C$_6$H$_5$)—NH, —CO—N(C$_6$H$_5$)—CO—, —CO—NH—CO—

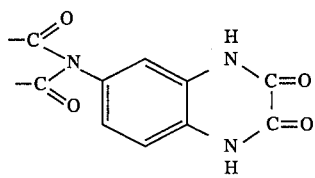

or

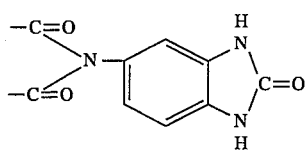

More preferably $R_1$ is $R_1''$ where $R_1''$ is a 1,8-naphthalene unsubstituted or substituted by 1 to 4 halogen atoms or mono- or di-substituted by methoxy or mono-substituted by nitro, acetylamino or benzoylamino.

Preferably $R_2$ is hydrogen.

Preferably Me is Me' where Me' is chromium, copper, manganese, iron, zinc, nickel or cobalt.

More preferably Me is Me" where Me" is copper, zinc, nickel or cobalt.

Preferably $R_4$ is $R_4'$ where $R_4'$ is —CH=CH—CH=CH—, —CH=C(Cl)—CH=C(Cl)—, —CH=CH—C(OCH$_3$)=CH—, —CH=CH—CH=C(OCH$_3$)—, —NH—CO—C(CN)=C(CH$_3$)—, —N(CH$_3$)—CO—C(CN)=C(CH$_3$)—, —N(C$_6$H$_5$)—CO—C(CN)=C(CH$_3$)— or

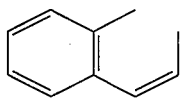

More preferably $R_4$ is $R_4''$ where $R_4''$ is —CH=CH—CH=CH—, —CH=C(Cl)—CH=C(Cl)— or

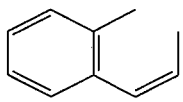

Most preferably $R_4$ is

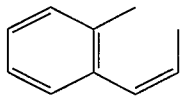

Compounds of formula I and II are known or can be made from known compounds by known methods. For example, compounds of formula I can be prepared by condensing one mole of a compound of formula III

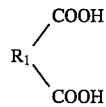

(or its acid halide or acid anhydride) with one mole of a compound of formula IV

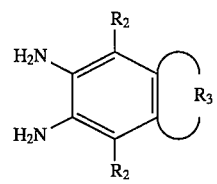

(or its salt form), in which the symbols $R_1$ to $R_3$ are as defined above.

The condensation can take place without solvent in molten form at temperatures of 150°–300° C. inclusive (preferably at 250° C.) or in inert solvent at temperatures from 250°–300° C. inclusive, preferably 100°–250° C. optionally in the presence of a catalyst.

Preferred solvents are high boiling aliphatic or aromatic hydrocarbons (e.g. xylene, diphenyl, nitrobenzene, chlorobenzene, chloronaphthalene, glycol ether, organic acids and acid amides). If the compound of formula III is used in free acid form, water can also be used as solvent. Compounds of formula II can be prepared by condensing 2 moles of a compound of formula V (or a mixture thereof)

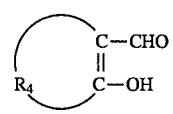

where R4 is as defined above;

with one mole of a compound of formula IV above (or its salt form); and metallising (either at the same time or after the condensation process) with one mole of the salt of a divalent metal.

Such metal salts include the chloride, formate and acetate.

The condensation reaction of the compounds of formula V with that of formula IV will generally take place in water or in a solvent system miscible with water, or for example a low molecular weight $C_{1-4}$alcohol, dimethylformamide, N-methylpyrrolidone, dimethyl-acetamide, a glycol, dioxane or a glycol ether. The temperature of the reaction is from 20° to 250° C., more preferably 30° to 150° C. Compounds of formulae I and II and their preparation are disclosed in CH 561,763 and U.S. Pat. No. 3,896,113, the disclosures of which are incorporated herein by reference.

The pigments used in a process according to the invention are excellent for mass pigmenting of synthetic polyamides (e.g. all types of nylon). Such polyamides are those resulting from the condensation or polymerisation of dicarboxylic acids and diamines—for example the condensation products of adipic acid and hexamethylene diamine, of lactams (e.g. ε-caprolactam) or of aminocarboxyclic acids (e.g. ω-aminoundecanoic acid). These products are mixed with the pigment and can be formed into fibres and textile articles by known methods, e.g. melt spinning, injection dye casting, injection extrusion or film blowing.

Mass pigmentation of polyamides is disclosed, for example, in DOS 1,670,238, DOS 3,504,143 and DOS 3,439,045, the disclosures of which are incorporated herein by reference. Preferably, the mass pigmentation process comprises mixing the pigment with molten polymer prior to molding the resulting mixture into the desired form. More preferably the pigment and polymer are premixed in finely divided solid form followed by melting of the polymer and further mixing. According to a further preferred technique, the pigment is added to the polymer in the form of a masterbatch, i.e. previously formed mixture of a relatively high concentration of pigment, i.e. 15 to 50%, by weight, in a relatively small amount of the same polymer that is to be pigmented. Typically, the masterbatch is prepared by extruding a mixture of pigment and polymer at 200° to 300° C. into the form of strands, which are cooled and then cut into particles of suitable size for mixing with additional polymer.

Preferably, the pigment is of a particle size less than 5 microns for mass pigmentation, more preferably about 1 to 2 microns. Size reduction of the pigment can, if necessary, be carried out during the preparation of a masterbatch, e.g. by shearing forces in the extruder.

The pigments used in a process according to the invention are not only heat stable at the molding temperatures of the synthetic polyamide, but also form light stable pigmentations.

The invention will now be illustrated by the following Examples in which all parts and percentages are by weight and all temperatures are in degrees Centigrade.

EXAMPLE 1

100 Parts of poly-ε-caprolactam in powder form are mixed with 1.0 part of the dyestuff of formula 1a

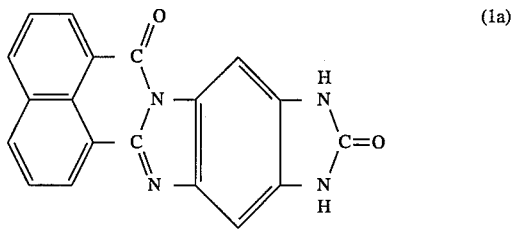

(1a)

(prepared according to Example 1 of Swiss Patent 561,763) in granulate powder form in a tumble mixer. The powder mixes well in a short time and agglomerate with the granulate. After mixing for about 10 minutes the mixture is taken for drying at 120° C. for 16 hours, after which it is placed in a melt spinning machine and after standing in the spinning machine (Fourne spinning machine spinning rate 1 kg/hr) for about 8 minutes at 275°–280° under a nitrogen atmosphere the resulting molten polymeric product is spun into fibres followed by stretching at room temperature (stretching ratio 1:4) on a Dienes tenser. The resulting yellow dyed fibres have good light fastness properties.

In a similar fashion, other synthetic polyamide fibres (e.g. Nylon or Perlon) can be mass-dyed.

EXAMPLES 2 to 74

Example 1 is repeated using 1 part of a compound of any one of Compounds 2 to 74 in place of the compound of formula 1a.

Compounds 2 to 74 are compounds of the formula

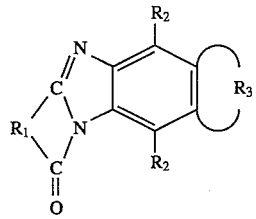

in which $R_1$, $R_2$ and $R_3$ are defined in Table 1 below.

TABLE 1

| Compound No. | $R_1$ | $R_3$ | Shade on Nylon 6,6 |
|---|---|---|---|
| 2 | O₂N-naphthyl | O₂N-naphthyl with HN-C(=O)-C(=O)-NH | reddish-yellow |
| 3 | phenyl | " | yellow |
| 4 | Cl-phenyl | " | " |
| 5 | 2,4-diCl-phenyl | " | " |
| 6 | 2,3,4,5-tetraCl-phenyl | " | orange |

TABLE 1-continued

| Compound No. | R₁ | R₃ | Shade on Nylon 6,6 |
|---|---|---|---|
| 7 | tetrabromo-xylene (Br at 4 positions, methyl at 2) | " | " |
| 8 | naphthalene-1,5-diyl | " | yellow |
| 9 | 5-chloronaphthalen-1,8-diyl ; 4-chloronaphthalen-1,5-diyl | " | " |
| 10 | 5-bromonaphthalen-1,8-diyl ; 4-bromonaphthalen-1,5-diyl | " | " |
| 11 | 3,7-dichloronaphthalen-1,5-diyl | 3-chloronaphthalen-1,8-diyl | N,N'-dimethyl oxamide ; yellow |
| 12 | 3,7-dibromonaphthalen-1,5-diyl | 3-bromonaphthalen-1,8-diyl | " | yellow |
| 13 | 4,8-dichloronaphthalen-1,5-diyl | " | orange |

TABLE 1-continued

| Compound No. | R₁ | R₃ | Shade on Nylon 6,6 |
|---|---|---|---|
| 14 | 2,8-dichloronaphthyl | " | red |
| 15 | tribromonaphthyl | " | red |
| 16 | 6-nitronaphthyl | 3-nitronaphthyl | yellow |
| 17 | 5-methoxynaphthyl | 4-methoxynaphthyl | orange |
| 18 | 1,2-dimethoxynaphthyl | " | orange-red |
| 19 | 5-aminonaphthyl | oxalamide-linked bis(aminonaphthyl) | red |
| 20 | 5-acetamidonaphthyl | 4-acetamidonaphthyl | yellowish-orange |

TABLE 1-continued

| Compound No. | R₁ | R₃ | Shade on Nylon 6,6 |
|---|---|---|---|
| 21 | 5,8-bis(benzamido)naphthalen-1-yl and 5-benzamidonaphthalen-1-yl (H₅C₆CONH- substituted naphthalenes) | " | yellow |
| 22 | 3-aminonaphthalen-1-yl and 5-aminonaphthalen-1-yl | " | red |
| 23 | 3,7-dinitronaphthalen-1-yl | " | yellow |
| 24 | 3,7-diaminonaphthalen-1-yl | " | red |
| 25 | 3,7-bis(acetamido)naphthalen-1-yl | $\text{CH}_3\text{NHCOCONHCH}_3$ (N,N'-dimethyloxamide) | orange |
| 26 | 3,7-bis(benzamido)naphthalen-1-yl | " | " |

TABLE 1-continued
| Compound No. | R₁ | R₃ | Shade on Nylon 6,6 |
|---|---|---|---|
| 27 | NHCOCH₃ (naphthyl), NHCOCH₃ (naphthyl) | " | " |
| 28 | NHCOC₆H₅ (naphthyl), NHCOC₆H₅ (naphthyl) | " | " |
| 29 | O₂N-, O₂N- (naphthyl) | " | brown |
| 30 | H₂N-, H₂N- (naphthyl) | 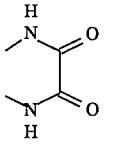 | red |
| 31 | 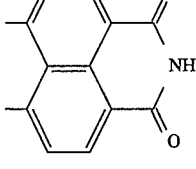 | " | yellowish-orange |
| 32 | 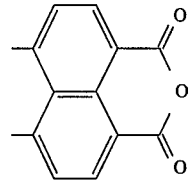 | " | " |
| 33 | 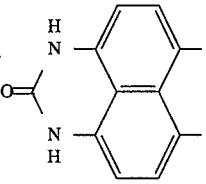 | " | yellow |

TABLE 1-continued

| Compound No. | R₁ | R₃ | Shade on Nylon 6,6 |
|---|---|---|---|
| 34 | [structure: naphthalene with H₃C-C(=N-)(NH-) bridge] | " | yellowish-orange |
| 35 | [structure: naphthalene with H₅C₆-C(=N-)(NH-) bridge] | " | yellowish-orange |
| 36 | [naphthalimide-N-phenyl structure with fused diketopiperazine] | [structure: -NH-C(=O)-C(=O)-NH-CH₃] | yellowish-orange |
| 37 | [naphthalimide-N-phenyl-benzimidazolone structure] | " | " |
| 38 | [naphthalene-1,8-dicarboximide with N-C₆H₅] | " | " |
| 39 | [o-tolyl / ortho-disubstituted benzene] | [structure: -NH-C(=O)-NH-CH₃] | yellow |
| 40 | [4-chloro-disubstituted benzene] | " | " |
| 41 | [2,3-dichloro-disubstituted benzene] | " | " |
| 42 | [tetrachloro-disubstituted benzene] | " | orange |

TABLE 1-continued
| Compound No. | R₁ | R₃ | Shade on Nylon 6,6 |
|---|---|---|---|
| 43 | 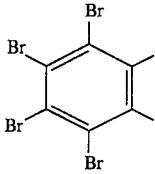 | " | " |
| 44 | 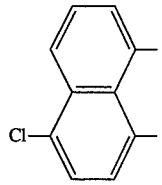 | 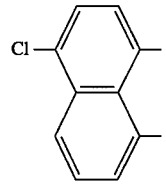 | orange |
| 45 | 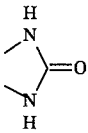 | 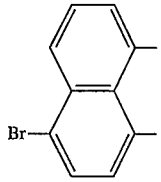 | " |
| 46 | 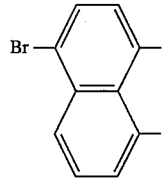 | 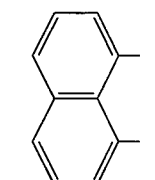 | " |
| 47 | 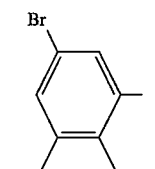 | " | orange-red |
| 48 | 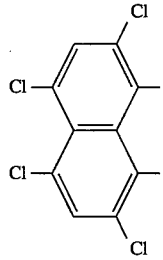 | " | red |
| 49 | 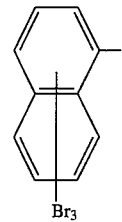 | " | red |

TABLE 1-continued

| Compound No. | R₁ | R₃ | Shade on Nylon 6,6 |
|---|---|---|---|
| 50 | 5,8-bis(O₂N)-naphthyl (1-naphthyl with O₂N groups) | 4-O₂N-1-naphthyl | brown |
| 51 | 2,6-bis(NO₂)-naphthyl | 3-NO₂-1-naphthyl | orange; R₃ = -NH-C(=O)-NH-CH₃ (methylurea) |
| 52 | 5-H₃CO-1-naphthyl | 5-H₃CO-1-naphthyl | " ; " |
| 53 | 4,5-bis(H₃CO)-1-naphthyl | " | reddish-violet |
| 54 | 5-H₂N-1-naphthyl | 4-H₂N-1-naphthyl | orange |
| 55 | 5-(H₃CCOHN)-1-naphthyl | 4-(H₃CCOHN)-1-naphthyl | " ; " |
| 56 | 5-(C₆H₅COHN)-1-naphthyl | 4-(C₆H₅COHN)-1-naphthyl | " ; " |
| 57 | 4,5-bis(O₂N)-1-naphthyl | -NH-C(=O)-NH-CH₃ | brown |

TABLE 1-continued

| Compound No. | R₁ | R₃ | Shade on Nylon 6,6 |
|---|---|---|---|
| 58 | 1,5-diamino-naphthalene (H₂N, H₂N substituents) | " | reddish-violet |
| 59 | naphthalene with NH–C(=O)–NH bridge | " | orange |
| 60 | naphthalene-1,8-dicarboxylic anhydride | " | " |
| 61 | naphthalene with N=C(CH₃)–NH | " | " |
| 62 | naphthalene with N=C(C₆H₅)–NH | " | " |
| 63 | naphthalimide (HN) | methylurea (HN–C(=O)–NH–CH₃) | orange-red |
| 64 | N-phenyl naphthalimide (H₅C₆–N) | " | " |
| 65 | N-(2-oxo-benzimidazol-5-yl) naphthalimide | " | " |

TABLE 1-continued

| Compound No. | $R_1$ | $R_3$ | Shade on Nylon 6,6 |
|---|---|---|---|
| 66 | 2,8-diaminonaphthalen-1-yl (H₂N groups at positions as shown) | 3-aminonaphthalen-1-yl | red |
| 67 | 2,7-dinitronaphthalen-1-yl | " | orange |
| 68 | 2,7-diaminonaphthalen-1-yl | " | red |
| 69 | 2,7-bis(acetamido)naphthalen-1-yl | HN-C(=O)-NH (methylurea type, H-N-C(=O)-N-H) | orange-red |
| 70 | 2,7-bis(benzamido)naphthalen-1-yl (NHCOC₆H₅) | " | " |
| 71 | 3-acetamidonaphthalen-1-yl (NHCOCH₃) | 3-acetamidonaphthalen-1-yl (NHCOCH₃) | orange |

TABLE 1-continued

| Compound No. | R₁ | R₃ | Shade on Nylon 6,6 |
|---|---|---|---|
| 72 | 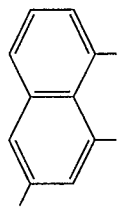 | 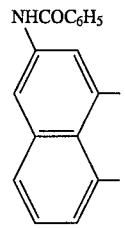 NHCOC₆H₅ | " | " |
| 73 | 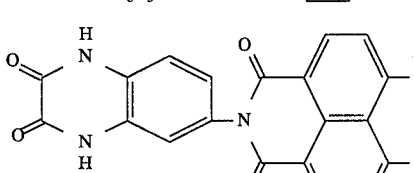 | | " | orange-red |
| 74 | 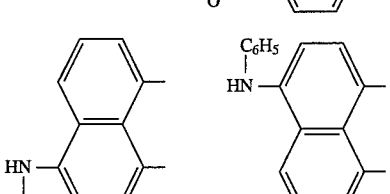 | | " | red |

EXAMPLES 75 to 96

Example 1 can be repeated using 1 part of Compounds 75 to 96 in place of the compound of Example 1.

Compounds 75 to 96 are compounds of the formula

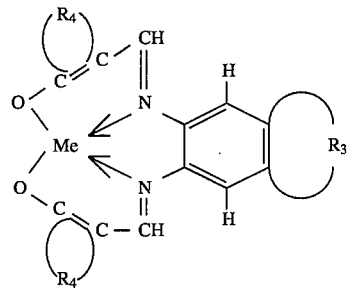

where $R_3$ and $R_4$ are as defined in Table 2 below. The compounds of Examples 75 to 96 an be made analogously to those of Example 1 of DOS 2263235 from suitable reactants.

TABLE 2

| Compound No. | R₄ | R₃ | Me | Shade on Nylon 6,6 |
|---|---|---|---|---|
| 75 | (o-methylphenyl) | —NH—CO—CO—NH— | Ni | yellowish-red |
| 76 | " | —NH—CO—NH— | " | orange |
| 77 | (phenyl) | —NH—CO—CO—NH— | " | yellowish-orange |
| 78 | " | " | Co | brown |

TABLE 2-continued
| Compound No. | R₄ | R₃ | Me | Shade on Nylon 6,6 |
|---|---|---|---|---|
| 79 | 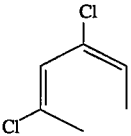 | " | Ni | brown |
| 80 | " | " | Cu | yellow |
| 81 | 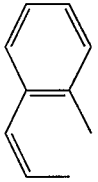 | " | Cu | orange |
| 82 | " | —NH—CO—NH— | Zn | yellowish-orange |
| 83 | " | " | Cu | brownish-orange |
| 84 |  | " | Cu | brownish-yellow |
| 85 |  | —NH—CO—NH— | Zn | yellow |
| 86 | 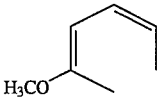 | " | Cu | yellow |
| 87 | 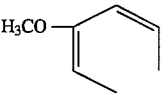 | " | Ni | orange |
| 88 | " | " | Zn | yellow |
| 89 | 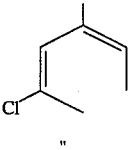 | " | Cu | yellowish-orange |
| 90 | " | " | Ni | orange |
| 91 | " | " | Zn | yellow |
| 92 | 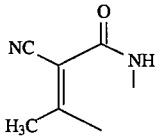 | " | Zn | " |
| 93 | 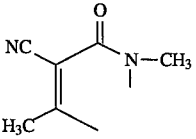 | " | Ni | reddish-orange |

TABLE 2-continued

| Compound No. | R4 | R3 | Me | Shade on Nylon 6,6 |
|---|---|---|---|---|
| 94 | 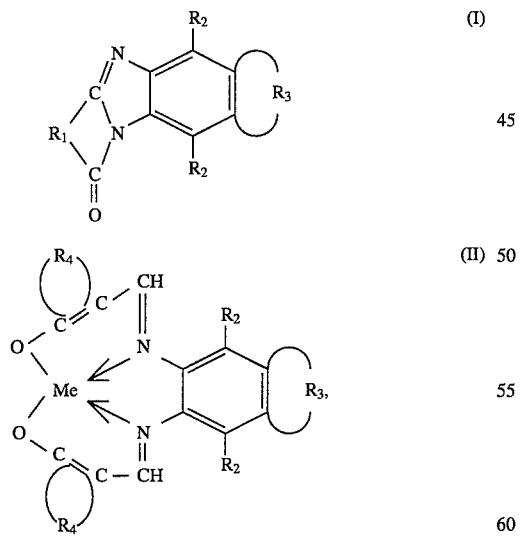 | " | Zn | " |
| 95 | | " | Cu | brownish-orange |
| 96 | | " | Co | yellowish-orange |

EXAMPLE 97

1.0 part of the dyestuff of formula 1a (particle size less than 5 μ) defined in Example 1 is mixed well with 4.0 parts of poly-ε-caprolactam in powder form. This is then extruded at a temperature between 260° and 280° C. in a Werner Pfleider extruder (at a rate of 100 kg/hr) and then granulated in a Werner Pfleider granulator. This granulate is then added to 96 parts of poly-ε-caprolactam powder and is mixed well. The resulting mixture is dried, melt spun into fibres and stretched, as in Example 1.

Instead of the dyestuff of Example 1, Example 97 can be repeated using any one of compounds 2 to 96 of Examples 2 to 96 respectively.

What is claimed is:
1. A process for pigmenting synthetic polyamide comprising pigmenting the polyamide in the mass with a compound of formula I or II

(I)

(II)

in which $R_2$ is hydrogen, trifluoromethyl, halogen, $C_{1-4}$alkyl, $C_{1-4}$alkoxy, cyano, nitro, hydroxyl, amino, $C_{1-4}$alkylamino, di-($C_{1-4}$) alkylamino, phenylamino, N-$C_{1-4}$alkyl-N-phenylamino; acyl, acyloxy or acylamino, Me is a divalent metal atom;

$R_1$ is 1,2-phenylene, 1,2-, 2,3- or 1,8-naphthylene or 2,2'-diphenylene, the phenylene and naphthylene groups of $R_1$ being unsubstituted or mono- or di-substituted by $R_{2a}$ where $R_{2a}$ has a significance of $R_2$ other than hydrogen or by 3 or 4 halogen atoms; or in the naphthylene group two adjacent carbon atoms can be bridged by —NH—CO—NH—, —N=C(CH₃)—NH—, —N=C(C₆H₅)—NH—, —CO—N(C₆H₅)—CO—, —CO—NH—CO—,

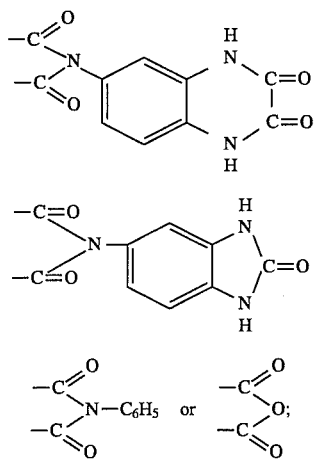

$R_3$ is

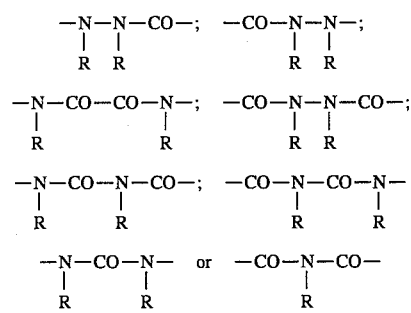

where R is hydrogen or $C_{1-4}$alkyl unsubstituted or substituted by 1 to 4 groups selected from halogen, cyano, $C_{1-4}$alkoxy, phenyl, phenoxy, acyl, acyloxy or acylamino; and $R_4$ together with the two carbon atoms to which it is attached forms a 5 or 6-membered carbocyclic or heterocyclic group or a 9- or 10-membered bicyclic carbocyclic or heterocyclic group, the rings of $R_4$ being unsubstituted or substituted by 1, 2 or 3 groups $R_{2a}$ where $R_{2a}$ has a significance of $R_2$ other than hydrogen or $R_4$ is —NH—CO—C(CN)=C($CH_3$)—, —N($CH_3$)—CO—C(CN)=C($CH_3$)— —N($C_3H_7$)—CO—C(CN)=C($CH_3$)—, or —N($C_6H_5$)—CO—C(CN)=C($CH_3$)—.

2. A process according to claim 1, in which $R_3$ is $R_3'$ where $R_3'$ is

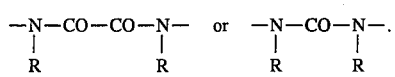

3. A process according to claim 1, in which $R_1$ is $R_1'$ where $R_1'$ is 1,2-phenylene unsubstituted or substituted by 1 to 4 halogen atoms or 1,8-naphthylene, unsubstituted or substituted by 1 to 4 halogen atoms or mono- or di-substituted by amino, nitro, methoxy, phenylamino, acetylamino or benzoylamino or bridged in the 4,5-position by —NH—CO—NH—, —N=C($CH_3$)—NH—, —N=C($C_6H_5$)—NH—, —CO—N($C_6H_5$)—CO—, —CO—NH—CO—

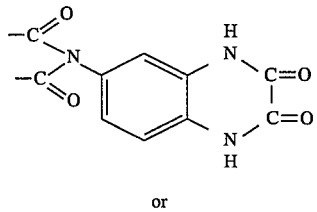

or

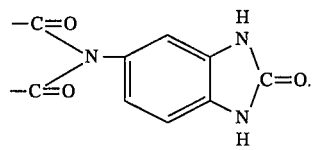

4. A process according to claim 3, in which $R_1$ is $R_1''$ where $R_1''$ is 1,8-naphthylene, unsubstituted or substituted by 1 to 4 halogen atoms or mono- or di-substituted by methoxy or mono-substituted by nitro, acetylamino or benzoylamino.

5. A process according to claim 1, in which Me is Me' where Me' is chromium, copper, manganese, iron, zinc, nickel or cobalt.

6. A process according to claim 1, in which $R_4$ is $R_4'$ where $R_4'$ is —CH=CH—CH=CH—, —CH=C(Cl)—CH=C(Cl)—, —CH=CH—C(OCH$_3$)=CH—, —CH=CH—CH=C(OCH$_3$)—, —NH—CO—C(CN)=C(CH$_3$)—, —N(CH$_3$)—CO—C(CN)=C(CH$_3$)—, —N(C$_6$H$_5$)—CO—C(CN)=C(CH$_3$)— or

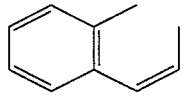

7. A process according to claim 6, in which $R_4$ is $R_4''$ where $R_4''$ is —CH=CH—CH=CH—, —CH=C(Cl)—CH=C(Cl)— or

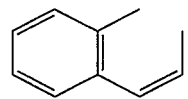

8. In a process wherein a synthetic polyamide is dyed in the mass by mixing a pigment with the molten polyamide, the improvement comprising employing as the pigment a compound of formula I or II as defined in claim 1.

9. A process according to claim 1 wherein, in the compounds of formulae I and II, any acyl group is a —CO—$R_{10}$, —$SO_2$—$C_6H_5$ or $SO_2C_{1-4}$alkyl group where $R_{10}$ is selected from $C_{1-4}$alkyl, phenyl, $C_{2-4}$alkenyl, $C_{1-4}$alkoxy, hydrogen and phenoxy; any acyloxy group is —O—CO—$R_{10}$, —O—$SO_2$—$C_6H_5$ or —O—$SO_2C_{1-4}$alkyl; and any acylamino group is —N($R_{10a}$)COR$_{10}$ or —N($R_{10a}$)$SO_2C_{1-4}$alkyl or —N($R_{10a}$)$SO_2$—$C_6H_5$ where $R_{10a}$ is hydrogen, $C_{1-4}$alkyl or phenyl.

10. A process according to claim 3, in which $R_3$ is $R_3'$ where $R_3'$ is

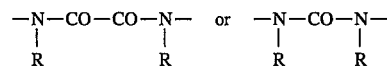

and $R_4$ is $R_4'$ where $R_4'$ is —CH=CH—CH=CH—, —CH=C(Cl)—CH=C(Cl)—, —CH=CH—C(OCH3)=CH—, —CH=CH—CH=C(OCH$_3$)—, —NH—CO—C(CN)=C(CH$_3$)—, —N(CH$_3$)—CO—C(CN)=C(CH$_3$)—, —N(C$_6$H$_5$)—CO—C(CN)=C(CH$_3$)— or

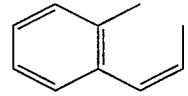

11. A process according to claim 9 wherein the synthetic polyamide is pigmented with a compound of formula I.

12. A process according to claim 10 wherein Me is Me' where Me' is chromium, copper, manganese, iron, zinc, nickel or cobalt.

13. A process according to claim 12, in which $R_1$ is $R_1''$ where $R_1''$ is 1,8-naphthalene, unsubstituted or substituted by 1 to 4 halogen atoms or mono- or di-substituted by methoxy or mono-substituted by nitro, acetylamino or benzoylamino; and $R_4$ is $R_4''$ where $R_4''$ is —CH=CH—CH=CH—, —CH=C(Cl)—CH=C(Cl)— or

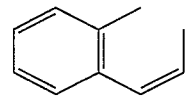

14. A process according to claim 12 wherein R and $R_2$ are hydrogen.

15. A process according to claim 13 wherein Me is Me" where Me" is copper, zinc, nickel or cobalt.

16. A process according to claim 13 wherein R and $R_2$ are hydrogen.

17. A process according to claim 15 wherein R and $R_2$ are hydrogen.

18. A process according to claim 16 which comprises pigmenting the synthetic polyamide with a compound of formula Ia

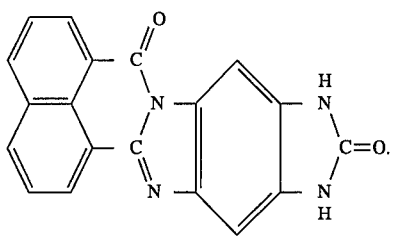

(1a)

19. A process according to claim 16 which comprises pigmenting the synthetic polyamide with a compound of the formula

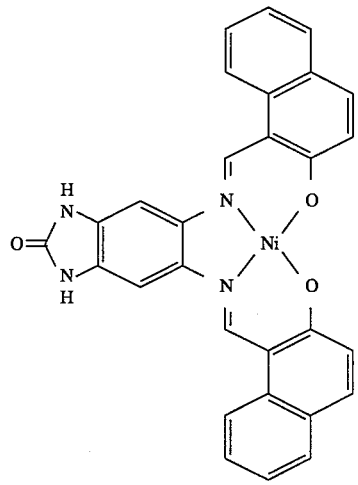

20. A process according to claim 16 wherein a compound of formula I or II is mixed with molten synthetic polyamide.

21. A process according to claim 18 which comprises mixing a compound of formula 1a with molten synthetic polyamide.

22. A process according to claim 19 which comprises mixing a compound of the formula specified therein with molten synthetic polyamide.

23. Synthetic polyamide pigmented by the process of claim 1.

24. Synthetic polyamide pigmented by the process of claim 9.

25. Synthetic polyamide pigmented by the process of claim 20.

26. Synthetic polyamide pigmented by the process of claim 21.

27. Synthetic polyamide pigmented by the process of claim 22.

28. A process according to claim 9 wherein the synthetic polyamide is pigmented with a compound of formula II.

* * * * *